United States Patent
Eimer et al.

(10) Patent No.: US 7,644,652 B2
(45) Date of Patent: Jan. 12, 2010

(54) DEVICE FOR FOAMING MILK, COMPRISING EXTERNAL SUCTION EQUIPMENT

(75) Inventors: Klaus Eimer, Ratingen (DE); Dieter Patzig, Ratingen (DE)

(73) Assignee: Nestec S.A., Vevey (CH)

( * ) Notice: Subject to any disclaimer, the term of this patent is extended or adjusted under 35 U.S.C. 154(b) by 95 days.

(21) Appl. No.: 11/569,341

(22) PCT Filed: May 17, 2005

(86) PCT No.: PCT/DE2005/000898

§ 371 (c)(1),
(2), (4) Date: Nov. 17, 2006

(87) PCT Pub. No.: WO2005/112717

PCT Pub. Date: Dec. 1, 2005

(65) Prior Publication Data

US 2007/0240582 A1    Oct. 18, 2007

(30) Foreign Application Priority Data

| May 18, 2004 | (DE) | 10 2004 025 038 |
| Feb. 1, 2005 | (DE) | 10 2005 004 852 |
| Mar. 6, 2005 | (DE) | 10 2005 010 599 |

(51) Int. Cl.
*A47J 31/00* (2006.01)
(52) U.S. Cl. .......... 99/293; 99/323.1; 99/453
(58) Field of Classification Search .......... 99/279–323, 99/275–277, 516, 323.3, 323.1, 495, 290–293, 99/452–455; 426/433; 261/DIG. 76, DIG. 16, 261/62, 79.2; 366/163–165
See application file for complete search history.

(56) References Cited

U.S. PATENT DOCUMENTS

| 4,922,810 | A | * | 5/1990 | Siccardi | 99/323.1 |
| 5,738,002 | A | * | 4/1998 | Marano-Ducarne | 99/293 |
| 5,855,162 | A | * | 1/1999 | Bauer et al. | 99/290 |
| 6,713,110 | B2 | * | 3/2004 | Imboden et al. | 426/511 |
| 6,959,642 | B1 | * | 11/2005 | Landolt | 99/455 |
| 7,270,050 | B2 | * | 9/2007 | Glucksman et al. | 99/297 |
| 2002/0134248 | A1 | | 9/2002 | Eugster | |

FOREIGN PATENT DOCUMENTS

| DE | 4445436 | 6/1996 |
| DE | 102004025037 A1 * | 12/2005 |
| DE | 102005010600 A1 * | 9/2006 |
| DE | 102005010601 A1 * | 9/2006 |
| EP | 1374748 | 1/2004 |
| WO | WO 00/16674 | 3/2000 |
| WO | WO2004054413 | 7/2004 |

* cited by examiner

*Primary Examiner*—Timothy F. Simone
(74) *Attorney, Agent, or Firm*—K & L Gates LLP

(57) ABSTRACT

The invention relates to a device (15) for foaming milk by means of external suction equipment (35), used as in accessory for espresso machines or similar domestic appliances. Said device comprises a fixed part that can be connected to the steam supply conduit (1) of said machines and an easily interchangeable disposable part (26) containing all parts that come into contact with the milk. The invention is characterised in that components of the disposable parts and in some embodiments of the invention even the entire disposable part consist(s) of thin-walled plastic tubes of the drinking straw type, which can be produced in a cost-effective and environmentally friendly manner by extrusion and subsequent thermoplastic forming. The use of the inventive device obviates the need for the inconvenient cleaning of conventional foaming nozzles and eliminates hygiene problems.

13 Claims, 3 Drawing Sheets

DEVICE FOR FOAMING MILK, COMPRISING EXTERNAL SUCTION EQUIPMENT

Figure 1:
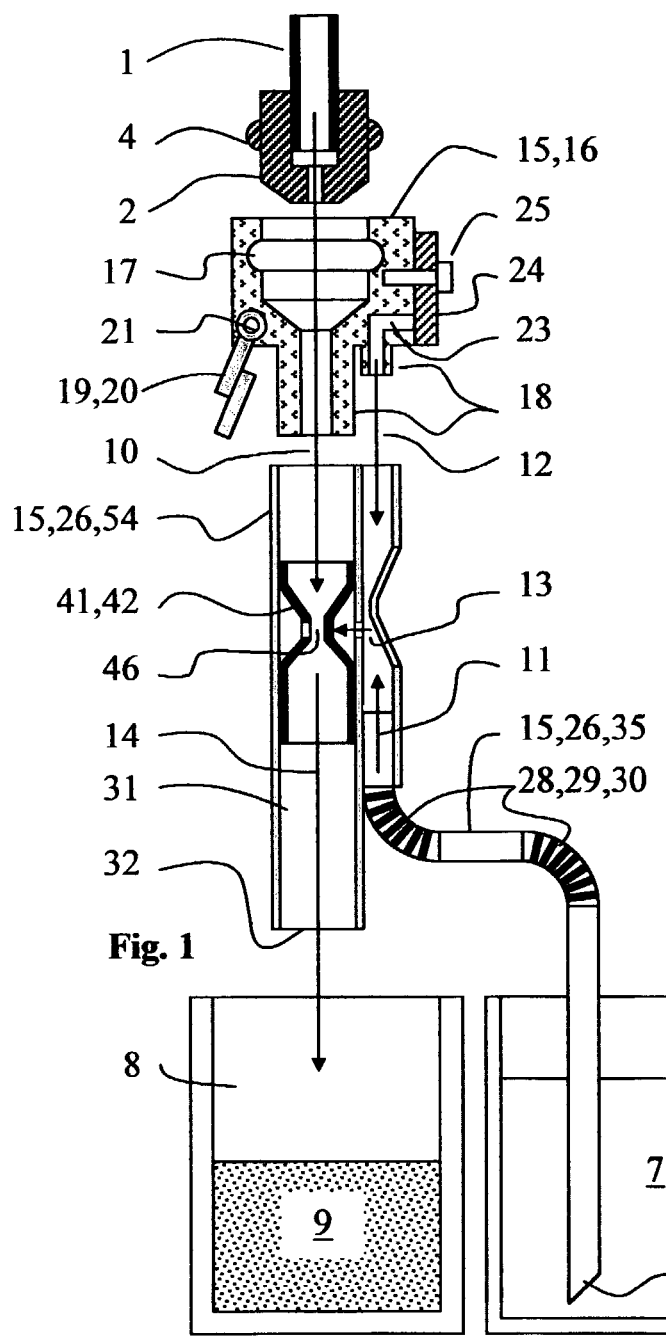

The invention relates to a device for the foaming of milk with external milk suctioning according to the generic term of Claim 1.

Such devices are known as an add-on device for connection to the steam supply provided with a steam nozzle of espresso machines or similar household appliances, wherein the device is equipped with a nozzle arrangement provided for the generation of vacuum pressure in a vacuum chamber by means of steam flow and possesses suction tubes separately or jointly conducted and connected to the vacuum chamber for milk and air or milk-air mixture and a discharge opening for the discharge of the generated steam-milk-air mixture and the milk suction tube can be submerged into the milk to be treated, which is located in the container for holding of the steam-milk-air mixture or is located in a separate container.

The European patent publication EP 1 115 317 A1 describes such a device, in which case via an external milk supply preferably from a separate milk container suctioned untreated milk is mixed with air in a pre-mix chamber and the milk-air mixture flows to the vacuum chamber of a nozzle arrangement and steam flow generated by the vacuum flows via an emulsifying chamber and discharge opening to a receiving container for the generated milk foam.

In particular for household espresso machines numerous additional devices for the generation of milk foam have been developed and become known, said devices being connectable as add-on units to the steam supply of the espresso machine provided with a steam nozzle and which suction milk from a separate milk container filled with milk and discharge the generated milk foam from a discharge opening. These devices also generate the desired milk foam in high quality, but possess the disadvantage that they must be cleaned after use. As simplest cleaning method it is proposed by the manufacturers to fill the milk container with water and to operate the device in place of the milk with water for cleaning and to rinse it with the water. The manufacturers also pay attention to relatively easy disassembly without the use of tools.

Both the rinsing process as well as the cleaning after disassembly of the device are time-consuming. If the cleaning is not performed directly immediately after use, milk residue caused also by the high temperature generated by the steam quickly dry on some parts and after that can only be cleaned up expensively.

The cleaning does not normally take place directly after the use of the device since the user—conditioned also by the presence of additional persons—is more likely to concentrate on the enjoyment of the generated cappuccino or other coffee-milk foam-beverage than on the cleaning task. Moreover, it is often not clear whether an additional use will take place in the immediate time sequence. If the cleaning e.g. does not take place until the next day, the milk residues in between are encrusted and can only be cleaned with difficulty The milk residues that have not been cleaned or only expensively in the interior of the nozzle arrangement and the milk suction tube then become a hygiene problem.

In the patent literature a device for the foaming of milk can also be found as WO 2004/054413, consisting essentially of a single-piece plastic body and a milk suction tube placed upon said body, which can also be designed as a drinking straw. While it is true that this device constitutes a distinct improvement compared to the prior art, it has not yet been introduced in practice and still appears to be too difficult to clean and too expensive and costly as a disposable item.

The object of the invention is to create a device for the foaming of milk with external milk suctioning as an add-on device for connection to the steam supply provided with a steam nozzle of espresso machines or similar household appliances whose operation is possible without expensive cleaning.

This object is solved according to the invention by a device with the features of Claim 1. Advantageous further developments are specified in the respective dependent claims.

For this purpose the invention teaches that the device is composed of at least one fixed part that can be connected to the steam supply with steam nozzle and one connectable disposable part arranged on the fixed part that can be easily removed from said fixed part, and the disposable part consists at least of a nozzle arrangement arranged in the region of the fixed part with vacuum chamber and suction tubes as well as a milk suction tube and a milk foam discharge tube with mixing chamber. The significant part of the invention is that the milk suction tube and milk foam discharge tube and in particular embodiments of the invention also the nozzle arrangement are designed essentially as thin-wall plastic tubes that can be cut to size which can be produced by extrusion molding and preferably by thermal deformation. The cross-section of the tubes can be circular or designed in another form.

For the design of the device with disposable part it is important that this is to be produced extremely cost-effectively. There are good experiences here with drinking straws, which are manufactured by extrusion molding as thin-wall plastic tubes made of polypropylene or other plastics, preferably thermoplastic plastics. In the same or an additional operation these thin-wall tubes—similar to the drinking straws—can be cost effectively equipped in certain places with a corrugated tube profile or other profiles or bulges. For special embodiments of the invention this favors the formation of bendable tube regions and in certain places diameter changes or indentations for partial blocking or the formation of nozzle arrangements as well as the joining of the tubes. Milk suction tube and milk foam discharge tube have diameters which are in the range of normal drinking straws of ca. 3 mm to 8 mm or slight beyond that up to 15 mm.

In a further embodiment of the invention the nozzle arrangement with vacuum chamber and at least parts of the suction tubes for milk or for milk and air or for the milk-air mixture is formed by at least one nozzle body preferably generated by plastic injection molding, said body being is fastened on its upper end to the fixed part and which possesses outlets for the tubes. Nozzle bodies of this type can be produced very cost-effectively by injection molding in multiple forms, also e.g. out of polypropylene. The can also be designed in two parts to avoid expensive molding technology due to necessary gate valves.

The nozzle arrangement with vacuum chamber and at least parts of the suction tubes are formed in a further special embodiment of the invention essentially by a thin-wall multiple tube section which can be produced by extrusion molding consisting of at least two plastic tubes arranged axis parallel to each other and joined to each other with at least one joint wall element, wherein at least the milk suction tube can be connected to one of the tubes and another of the tubes serves at least the purpose of supplying the steam flow and discharging the milk foam flow. The nozzle arrangement with vacuum chamber and at least parts of the suction tubes can in a preferred embodiment of the invention be formed by indentations and bulges on the multiple tube section which can be generated by thermal deformation. With this the manufacturing expenses for the nozzle body are omitted and an overall very cost-effective solution results.

Also the use of a thermoplastic tube section made of a thin-wall tube similar to the milk suction tube and milk foam discharge tube and fastened in the milk foam discharge tube lies within the scope of the invention. This forms on its exterior to the wall of the milk foam discharge tube a torus into which the milk and air streams flow, mix with each other and after that enter the vacuum chamber. The tube section is preferably arranged in one of the tubes of the multiple tube section.

The disposable part is formed in specified embodiments of a plurality of component parts, wherein the component parts can be joined together expediently by means of an assembly machine quite cost-effectively and can be connected to each other by clamping, bonding, selective hot forming or welding e.g. by ultrasound or laser.

The nozzle arrangement for generation of the vacuum pressure necessary for the suctioning of milk and air can consist of a venturi tube with vacuum chamber in the bottleneck or of an open jet nozzle, such as e.g. used in spray cans, wherein the open jet in the case of an erratic cross-section expansion of the nozzle to the vacuum chamber brings about a suctioning in its exterior region.

The suction tubes for milk and air can be conducted in completely variable manner within the scope of the invention. It is advantageous in this connection if the air is first mixed with the milk before the milk is suctioned from the steam jet.

In the case of espresso machines in many cases the steam nozzle forms the termination of the steam supply. In this case in a particular embodiment of the invention it is expedient to fix the fixed part to this steam nozzle. In this connection it is possible for simple assembly purposes to manufacture the fixed part out of an elastic plastic. This then also simplifies the fastening of the disposable part on the fixed part. The fixed part however can in another embodiment of the invention also be clamped with a clamping device, wherein in another embodiment of the invention the disposable part can be slid over a tubular formation of the fixed part and clamped.

In special embodiments of the invention the air flow into the supply tube can be blocked in the region of the fixed part or of the milk suction tube. With this the user can choose whether he wants to heat and foam the milk or only heat it. In another embodiment of the invention the milk flow or the milk-air flow can be adjusted quantitatively.

In a preferred embodiment of the invention the air flow can be supplied via an air-core choke arranged in the region of the outlet of the milk suction tube on the nozzle body in the wall of the milk suction tube. In another embodiment of the invention the air-core choke consists of a preferably circular constructed opening or recess in the wall whose cross-section of flow corresponds to a diameter of 0.2 mm to 0.8 mm of a circular opening, preferably 0.3 mm to 0.6 mm recesses or openings with non-circular form (e.g. elliptical or quadratic form) thus requiring a correspondingly dimensioned cross-section. In a preferred embodiment of the invention the opening can be produced by means of thermal deformation of the thin-wall milk suction tube (thus e.g. by injection of a mandrel heated with corresponding diameter).

In additional special embodiments of the invention a flavor dispenser is integrated into the disposable part, which flavors are dissolved by the steam flow and/or the milk flow and are carried in the milk foam. In the process it can for example be a matter of a taste change of the milk or the milk foam into a "Viennese blend" coffee.

The object of the fixed part according to the invention in the case of an intended use not moistened with milk is to be able to design the disposable part as simple, small and cost effective as possible and to make its combinability with the steam supply as convenient possible. The fixed part can on the other hand be designed more expensively, since it is not designed by milk for permanent usage. An additional advantage of the fixed part is the fact that the disposable parts can be identically designed for use at different espresso machines, since the differences between the espresso machines are then covered by the in that case variable fixed parts. This simplifies the marketing of the disposable parts.

However if espresso machines are available in great number with identical outlet measurements at the steam supply equipped with steam nozzle for equipping with single use foam nozzles, the use of fixed parts is expensive, since these are all identically designed.

For this reason it also lies within the scope of the invention to integrate the fixed part into the steam supply or into the steam nozzle forming the termination of the steam supply and therefore suitable design the steam supply (e.g. designed as a tube) or the steam nozzle as termination of the steam supply for the coupling of the disposable part. In this particular embodiment there is thus no fixed part as a component part. For this purpose it can be advantageous to equip the disposable part equipped with a nozzle body with an additional steam tube which makes possible the supply of steam from steam supply/steam nozzle to the nozzle body.

The plastic tube (preferably steam tube or multiple tube section) supplying the steam flow of the nozzle arrangement possesses for this purpose a shape on its upper end with steam inlet which permits a connection to the steam supply or the steam nozzle that can quickly be established and detached again. In the preferred embodiment in the connection to the steam nozzle of the espresso machine the steam tube is expanded as termination of the steam supply in the region of the outlet. This expansion can be omitted if the steam supply itself is designed as a fixed part. The inner diameter of the steam tube in the region of the outlet in preferred embodiment corresponds approximately to the outer diameter of the steam supply or the steam nozzle and is preferably fixed on the fixed part by means of locking ring/locking groove using the elastic expandability of the steam tube.

Figure 2:
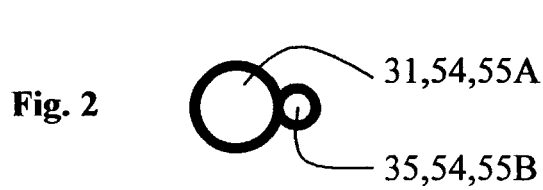

The invention will be explained in greater detail in the following with the help of exemplary embodiments. The figures show the following in schematic representation:

FIG. 1 device according to the invention with separately displayed fixed part and disposable part under steam supply with steam nozzle, with separate containers for milk and milk foam FIG. 2 section through the multiple tube section according to FIG. 1

Figure 3:
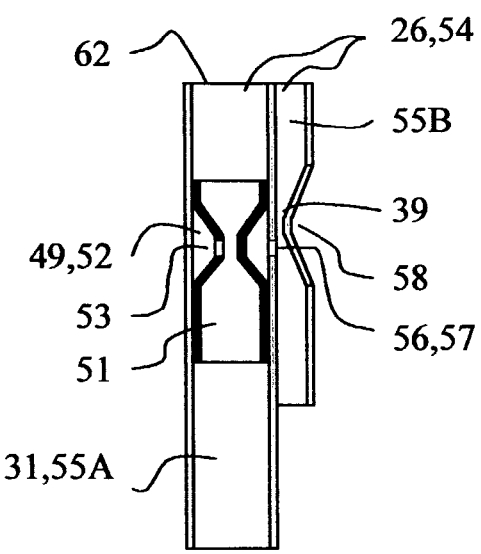

FIG. 3 detail of FIG. 1

Figure 5:
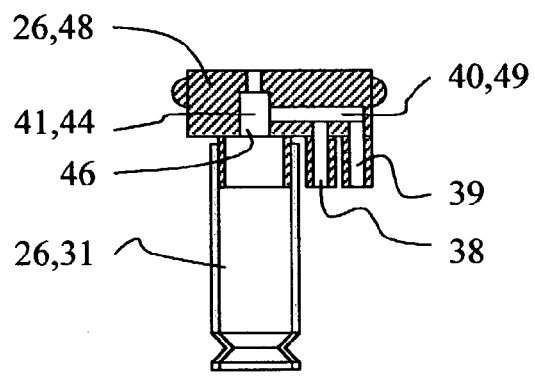
Figure 4:
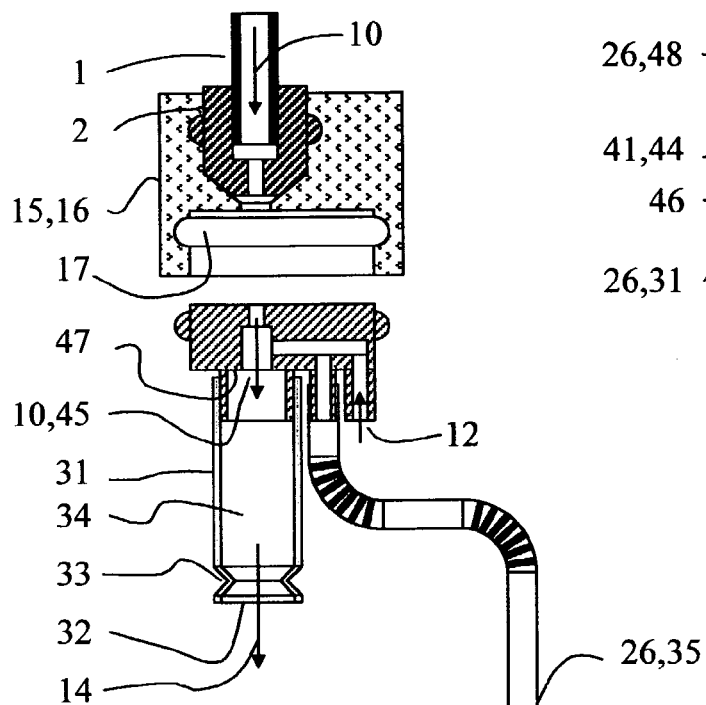

FIG. 4 different embodiment according to the invention of fixed part and disposable part with nozzle body, fixed part mounted on steam nozzle, disposable part shown separately FIG. 5 detail of FIG. 4

Figure 6:
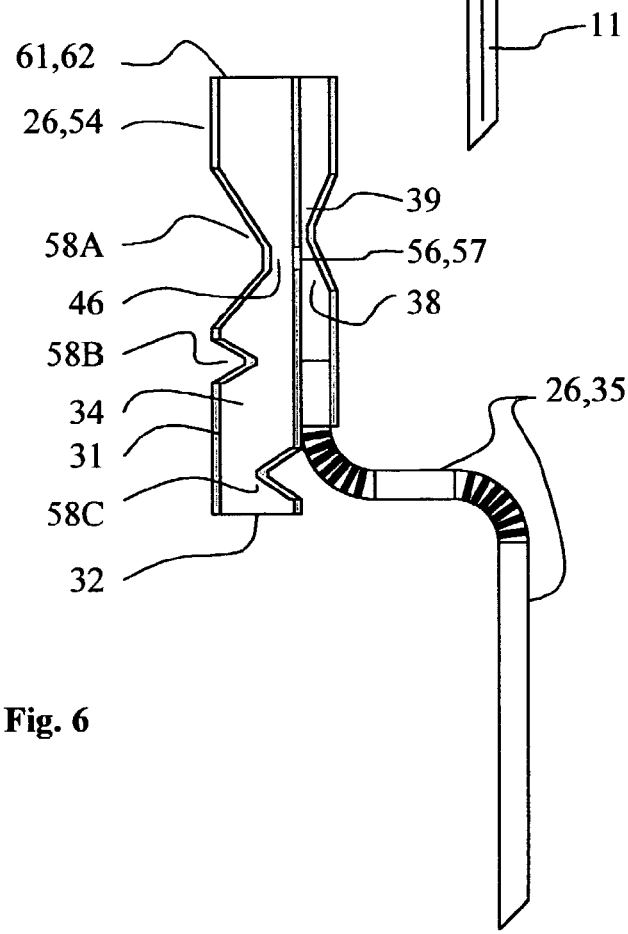
Figure 7:
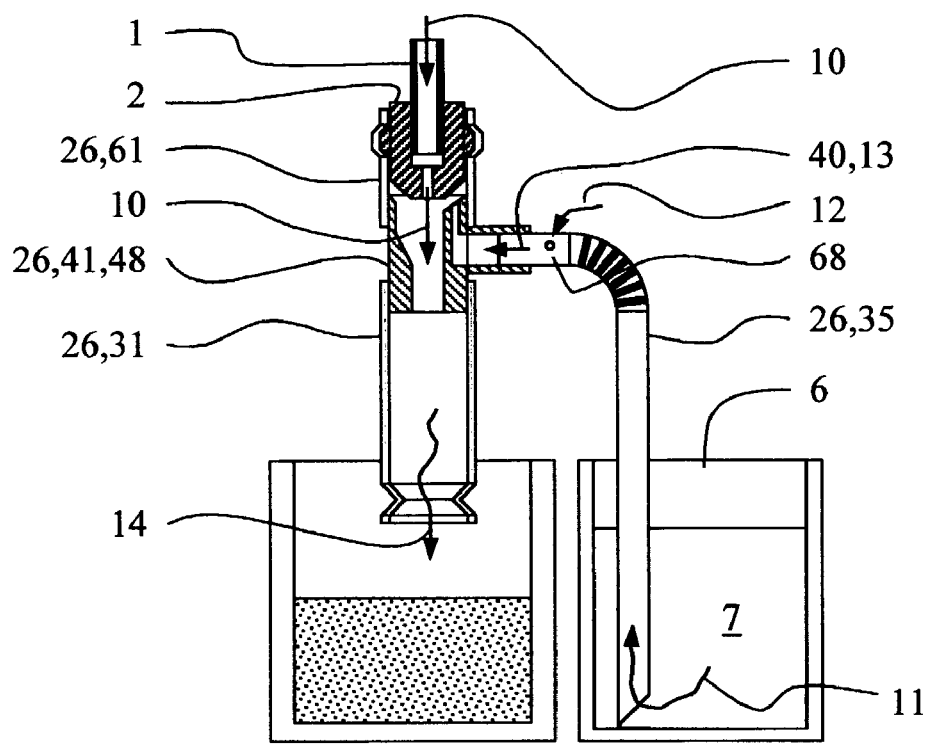
Figure 8:
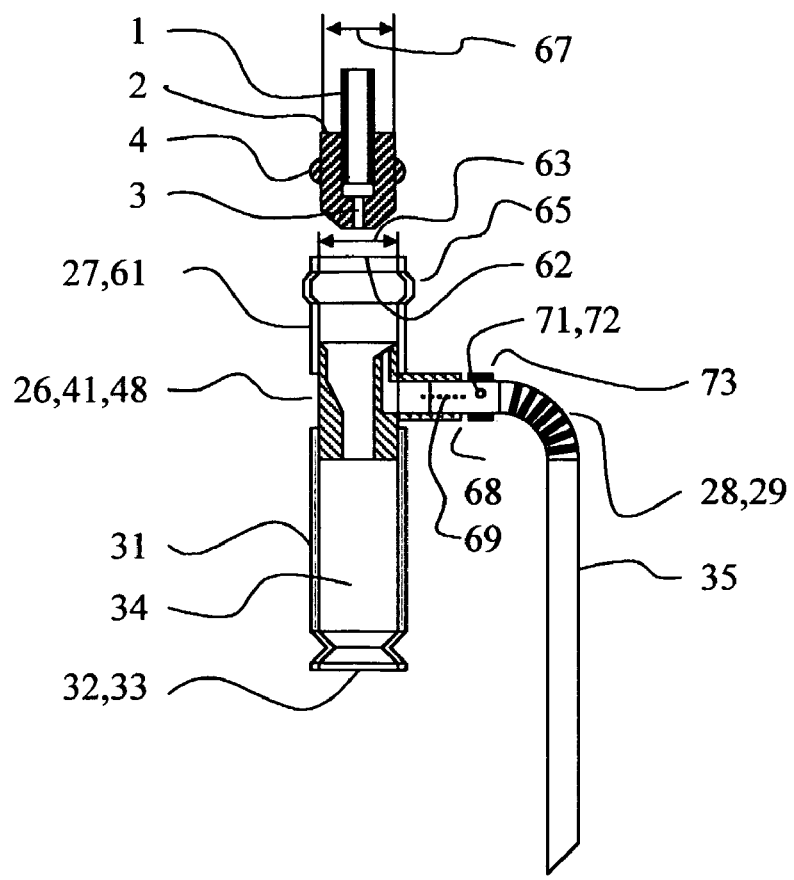

FIG. 6 additional embodiment of a disposable part according to the invention, shown without fixed part FIG. 7 additional embodiment of a device according to the invention with additional steam tube attached to a steam nozzle acting as a fixed part FIG. 8 disposable part according to FIG. 7, ready to be attach to steam nozzle FIG. 1 shows an embodiment of a device (15) according to the invention with separate fixed part (16) and disposable part (26) under steam supply (1) with steam nozzle (2). In FIG. 2 for the embodiment according to FIG. 1 a section is shown through the two tubes (55A, 55B) of the multiple tube section (54), which FIG. 3 shows in detail. The milk suction tube (35) is submerged into a milk container (6) which is partially filled with the milk (7) that is to be suctioned. The milk foam flow (14) exiting the device (15) via the discharge opening (32) reaches the separate milk foam container (8) which is partially filled with foamed milk (9).

The fixed part (6) is preferably made out of elastic plastic in order to be able to connect it in simple manner to the steam nozzle (2) of the steam supply (1). For this purpose the body of the steam nozzle (2) is equipped with a locking ring (4) into which the locking groove (17) of the fixed part (16) locks. The connection between fixed part (16) and disposable part (26) which can be established and detached quickly and easily is secured via a clamping device (19), for which purpose the disposable part (26) can be slipped onto tube-shaped formations (18) of the fixed part (16). This clamping device (19) consists in this embodiment of at least one clamp jaw (20) conducted in a bearing (21) and being pressed on for example by a clamping spring (22) not shown, said jaw being shown in FIG. 1 in raised state. After slipping the disposable part (26) onto the fixed part (16) the clamping jaw (20) comes to rest.

The disposable part (26) consists of a multiple tube section (54) with two tubes (55), wherein the one tube (55A) serves as a milk foam tube (31) and for fastening on the fixed part (16) and the other tube (55B) is for supplying the air flow (12) and the milk flow (11) via the milk suction tube (35) mounted on the multiple tube section (54). The tube (55B) is provided with an indentation (58) generated e.g. by thermoplastic deformation, which forms a part of the air suction tube (39), limits the air flow (12) quantitatively and supplies it to the milk flow (11). The milk-air flow (13) reaches the torus (52) of the tube section (51), which is fastened in the tube (55A) via the wall opening (57) in the joint wall element (56) connecting the two tubes (55A, 55B), and from this torus (52) serving as a mixing chamber (49) and from the suction opening (53) into the vacuum chamber (46) of the nozzle arrangement (41) designed as a venturi tube (42).

In this embodiment of the invention in two corrugated lengths of tube (30) the milk suction tube (35) is equipped with a wave profile (28) with a multitude of waves (29), in order to make it easily deformable. As a result the position of its milk inlet (36) provided with a bevel (37) can be adapted to different arrangements of milk container (6) and milk foam container (8), thus also the distance between milk inlet (36) and discharge opening (32).

The fixed part (16) is equipped with an operable termination (24) for its air supply (23) which in this embodiment is pivotally attached in a bearing (25). With this the operator of the device can choose between the operating positions "Foam and Heat Milk" or "Heat Milk".

The steam supply (1) is part of a machine not shown which is equipped with a steam generator for the production of coffee, espresso or cappuccino. The device (15) according to the invention is an accessory part to machines of this kind. The steam flow (10) enters via the steam nozzle (2) into the fixed part (16) and flows to the nozzle arrangement (41) of the disposable part (26). The nozzle arrangement (41) is designed in the represented embodiment with a venturi tube (42), but could also be constructed as an open jet nozzle (44), or in an in and of itself known manner in other embodiments of the invention as a multiple nozzle with diametrical variations and series connected emulsifying chambers.

The fixed part (16) is intended for continuous use and can therefore be manufactured of high grade material in expensive production methods. The disposable part (26) on the other hand is intended for replacement against a new part after some applications in order to avoid expensive cleaning and unhygienic operation with parts not completely cleaned. For this reason the disposable part (26) in this embodiment of the invention consists of thin-wall plastic tubes that can be produced extremely cost-effectively as they are used, also including the wave profile (30), e.g. for drinking straws.

The production takes place normally by extrusion molding, perhaps with subsequent thermoplastic deformation, e.g. for wave profiles (30). The wall thickness of the tubes (51, 55, 35) is typically 0.1 to 0.2 mm, at the most 0.3 mm. The milk suction tube (35) typically has a diameter of from 3 to 6 mm, at the most 8 mm, the diameter of the milk foam discharge tube (31) being from 7 to 10 mm, at the most 15 mm.

FIG. 4 shows an additional embodiment of the device (15) of the invention; FIG. 5 shows a section from FIG. 4. The fixed part (16) consists preferably of elastic plastic in order to be able to fasten it easily to the steam nozzle (2). However, other types of connection e.g. with rigid fixed parts (16) and elastic sealing rings are also within the scope of the invention. The separately shown disposable part (26) consists of a nozzle body (48), which for the purpose of mounting on the fixed part locks into its locking groove (17), the milk foam discharge tube (31) and milk suction tube (35) attached to the nozzle body (48) and fastened there with known fastening techniques. The nozzle arrangement (41) consists in this embodiment of an open jet nozzle (44), in whose vacuum chamber (46) the milk-air-suction tube (40) runs, into which in its course a mixing chamber (49) not particularly represented is integrated. Deviating from the representation in FIG. 3 the nozzle body (48) through its spatial expansion makes possible the optimum formation of a mixing chamber (49). The open jet (45) with vacuum pressure formation arises due to the fact that the wall (47) of the vacuum chamber (46) is arranged in the region of the open jet nozzle (44) under such a great angle up to approximately perpendicular to the direction of the steam flow (10), that the flow cannot come to rest at the wall (47) and separates from it.

The milk foam discharge tube (31) is in this embodiment provided with a narrowing (33) in the region of the discharge opening (32), which favors the thorough mixing in the mixing chamber (34). In similar manner in other embodiments of the invention multiple-stage diameter expansions of the milk foam discharge tube (31) can be realized in the mixing chamber (34).

The nozzle body (48) of this embodiment of the invention can be produced cost-effectively by means of plastic injection molding when the injection mold can be designed as a multiple tool without sprue lock devices. For this purpose the nozzle body (48) is expediently produced in two parts, which makes it possible to avoid sprue lock devices for the suction tubes (38, 39, 40). The two parts are joined together, e.g. welded or glued. The connection between nozzle body (48) and milk foam discharge tube (31) and milk suction tube (35) takes place by means of frictional connection from the elasticity of the tubes (31, 35) or by point bonding or welding (e.g. with ultrasound) or by thermal indentation of the tubes (31, 35) in a corresponding arching of the nozzle body (48) or by other known measures of joining technology.

It also lies within the scope of the invention to equip the nozzle body (48) with other nozzle arrangements (41), other forms of connection between fixed part (16) and disposable part (26) etc.

In FIG. 6 in an additional embodiment of the device (15) according to the invention a disposable part (26) is shown which consists of a multiple tube section (54) in which the milk suction tube (35) is fastened and whose nozzle arrangement—schematically represented here—can be produced exclusively by indentations and bulges (58). The venturi tube (42) is formed by the indentation (58A) in the milk foam discharge tube (31) of the multiple tube section (54). The air suction tube (39) and milk suction tube (38) are designed as in the embodiment to FIG. 1. The milk-air flow (13) flows to the vacuum chamber (46) via the wall opening (57) in the joint wall element (56). In the region of the mixing chamber (34), also called emulsifying chamber, further indentations (58B, 58C) are arranged in order to improve the thorough mixing.

FIG. 7 and FIG. 8 show an additional preferred embodiment of the invention in which the milk suction tube (35) with its tube axis (69) is arranged in the region of the outlet (68) at the nozzle arrangement (41) designed as nozzle body (48) perpendicular to the tube axis of the milk foam discharge tube (31) and in the region of the outlet (68) is equipped with an air-core choke (71) designed as an opening (72) in the wall (70) of the milk suction tube (35). Furthermore in a special embodiment of the invention a steam tube (61) is joined to the nozzle body (48), which establishes the connection to the steam nozzle (2) designed as fixed part (16). In this embodiment the subject matter of the invention manages without an additional fixed part (16), said part being so to speak is integrated into the steam supply (1) or—as shown here in the steam nozzle (2).

The disposable part (26) is fixed by means of a locking groove (65) of the steam tube (61) on the locking ring (4) of the steam nozzle (2), wherein the diameter D1 (67) is only slightly smaller than D2 (63), and wherein the elastic properties of the steam tube (61) hold the disposable part (26) in position.

FIG. 8 shows in addition to FIG. 7 as special embodiment of the invention a grommet (73) designed here as a tube section for the opening (72), which can be opened or closed by moving the grommet (73), in another embodiment also by turning, in order to be able to select the operating between "Heat and Foam" or only "Heat".

FIG. 1 through FIG. 8 show only individual embodiments of many possible ones, which should all lie within the scope of the invention. The displayed embodiments of the device (15) according to the invention contain differing detail designs which are not intended to be restricted to the respectively represented combination, but rather are to be interchangeable. This relates in particular to the design of the nozzle arrangement (41) as a venturi tube (42) or open jet nozzle (44) by a nozzle body (48), a thin-wall tube section (51) or indentations (58).

Overall the invention creates a device (15) for the foaming of milk with external milk suction (35) as an add-on device for connection to the steam supply (1) equipped with a steam nozzle (2) of cappuccino machines or similar household machines whose operation is possible without expensive cleaning. The proposed embodiments show that a simple and cost-effective production of the disposable part (26) is possible, wherein the low costs, the slight weight, the required environmentally friendly design for a disposable part e.g. permit its daily replacement. The production of the tubes (31, 35, 61) and tube sections (51, 54) and their diameter narrowing (33), indentation/bulging (58), profiling in wave profiles (28) or as torus (52), production of openings (53, 57, 72) and cuttings (37 etc.) can take place extensively on the cost-effective machines known from drinking straw production.

REFERENCE LIST

1 Steam supply
2 Steam nozzle
3 Nozzle opening Steam nozzle
4 Locking ring Steam nozzle
5 Locking groove Steam nozzle
6 Milk container
7 Milk
8 Milk foam container
9 Foamed milk
10 Steam flow
11 Milk flow
12 Airflow
13 Milk-air flow
14 Milk foam flow
15 Device for the foaming of milk
16 Fixed part
17 Locking groove Fixed part
18 Tubular formation of the fixed part
19 Clamping device
20 Clampingjaw
21 Bearing Clamping jaw
22 Clamping spring
23 Air supply Fixed part
24 Operable termination air supply
25 Arrangement of bearings Termination
26 Disposable part
27 Plastic tube
28 Wave profile tube
29 Wave of the tube
30 Corrugated length of tube
31 Milk foam discharge tube
32 Discharge opening
33 Narrowing Discharge opening
34 Mixing chamber in front of discharge opening
35 Milk suction tube
36 Milk inlet
37 Bevel milk inlet
38 Milk suction tube
39 Air suction tube
40 Milk-air suction tube
41 Nozzle arrangement
42 Venturi tube
43 Narrow place Venturi tube
44 Open jet nozzle
45 Openjet
46 Vacuum chamber
47 Wall Vacuum chamber
48 Nozzle body
49 Mixing chamber Nozzle body
50 Suction opening from Torus Nozzle body
51 Tube section with nozzle arrangement
52 Torus
53 Suction opening
54 Multiple tube section
55 Tube of multiple tube section
56 Joint wall element of connected tubes
57 Wall opening
58 Indentations/Bulges on the multiple tube section
59 Adjustment part for milk flow
60 Flavor dispenser
61 Steam tube
61 Steam inlet in the steam tube, plastic tube, multiple tube
63 Inner diameter D2 steam tube, plastic tube, multiple tube
64 Locking ring steam tube, plastic tube, multiple tube
65 Locking groove steam tube, plastic tube, multiple tube 66 Reinforcing ring steam tube, plastic tube, multiple tube
67 Outer diameter Steam tube/Steam supply D1
68 Outlet Milk suction tube on nozzle body
69 Tube axis in the region of the outlet
70 Wall Milk suction tube
71 Air-core choke
72 Opening in Wall Milk suction tube
73 Grommet

The invention claimed is:

1. Device for foaming milk with external milk suctioning as an add-on device for connection to a steam supply provided with a steam nozzle of espresso machines or similar household appliances, the device having a nozzle arrangement to generate vacuum pressure in a vacuum chamber by means of steam flow and suction tubes connected to the vacuum chamber for a milk and air or milk-air mixture and a discharge opening to discharge a generated steam-milk-air mixture, the device comprising at least one fixed part that can be connected to the steam supply with the steam nozzle and one disposable part located on the fixed part that can be removed from the fixed part, and the disposable part comprising at least a nozzle arrangement arranged in a region of the fixed part with the vacuum chamber and the suction tubes as well as a milk suction tube and a milk foam discharge tube, wherein at least two tubes comprise thin-wall plastic tubes that can be produced by extrusion molding.

2. Device according to claim 1, wherein the nozzle arrangement with the vacuum chamber and at least parts of the suction tubes are formed by at least one nozzle body, to which at least the milk suction tube and the milk foam discharge tube can be connected.

3. Device according to claim 1, wherein the nozzle arrangement with vacuum chamber and at least parts of the suction tubes comprise thin-wall multiple tube sections which can be produced by extrusion molding consisting of at least two plastic tubes arranged with axis parallel to each other and joined to each other with at least one joint wall element, wherein at least the milk suction tube can be connected to one of the tubes and another of the tubes serves at least the purpose of supplying the steam flow and discharging the milk foam flow.

4. Device according to claim 3, wherein the nozzle arrangement with the vacuum chamber and at least parts of the suction tubes comprise indentations and bulges on the multiple tube section produced by thermal deformation.

5. Device according to claim 3, wherein at least one of the joint wall elements of the tubes connected to each other is provided with at least one wall opening as part of the suction tubes.

6. Device according to claim 3, wherein the nozzle arrangement with the vacuum chamber and at least parts of the suction tubes comprise a tube section which can be produced by extrusion molding and subsequent thermal deformation, the tube section being fastened adjacently on the wall of a tube of the multiple tube section and forming a torus to the tube.

7. Device according to claim 6, wherein at least one of the joint wall elements of the tubes connected to each other is provided with at least one wall opening as part of the suction tubes, and one suction opening from the torus is available for the vacuum chamber.

8. Device according to claim 1, wherein the nozzle arrangement consists of a venturi tube having a most narrow portion that forms the vacuum chamber.

9. Device according to claim 1, wherein the disposable part can be slipped onto at least one tubular formation of the fixed part and can be fixed there by a clamping device for replacement of the disposable part.

10. Device according to claim 1, wherein the fixed part consists of an elastic material and the disposable part is positioned on the fixed part by elastic forces.

11. Device according to claim 1, wherein the air flow can flow to the disposable part via the fixed part.

12. Device according to claim 1, wherein the air flow can flow directly to the disposable part.

13. Device for foaming milk as an add-on device for an espresso machine, the device comprising suction tubes connected to a vacuum chamber for milk and air or milk-air mixture and a discharge opening to discharge a generated steam-milk-air mixture and the milk suction tube device comprises at least one fixed part that can be connected to the steam supply with steam nozzle and one disposable part that can be removed from the fixed part, and the disposable part comprises at least a nozzle arrangement arranged in the region of the fixed part with vacuum chamber and suction tubes as well as a milk suction tube and a milk foam discharge tube, wherein at least two tubes comprise thin wall plastic tubes.

* * * * *